(12) United States Patent
Nakayama et al.

(10) Patent No.: US 7,732,965 B2
(45) Date of Patent: *Jun. 8, 2010

(54) EMBEDDED MAGNET TYPE MOTOR (75) Inventors: Takahiro Nakayama, Hamamatsu (JP); Hirotaka Itoh, Kosai (JP); Yoshiyuki Takabe, Hamamatsu (JP); Keisuke Koide, Kosai (JP); Yoshihito Nishikawa, Toyohashi (JP)

(73) Assignee: ASMO Co., Ltd., Shizuoka-Ken (JP)

( * ) Notice: Subject to any disclaimer, the term of this patent is extended or adjusted under 35 U.S.C. 154(b) by 58 days.

This patent is subject to a terminal disclaimer.

(21) Appl. No.: 12/108,135

(22) Filed: Apr. 23, 2008

(65) Prior Publication Data
US 2008/0265706 A1    Oct. 30, 2008

(30) Foreign Application Priority Data
Apr. 27, 2007  (JP) .............................. 2007-119683
Apr. 17, 2008  (JP) .............................. 2008-107515

(51) Int. Cl.
*H02K 1/27* (2006.01)

(52) U.S. Cl. ............................ 310/156.57; 310/156.53; 310/156.56

(58) Field of Classification Search ................................. 310/156.38–156.49, 156.53, 156.56–156.57
See application file for complete search history.

(56) References Cited

U.S. PATENT DOCUMENTS

| | | | | |
|---|---|---|---|---|
| 3,840,763 A | * | 10/1974 | Baumann et al. | 310/156.56 |
| 6,031,311 A | * | 2/2000 | Lee | 310/156.57 |
| 6,441,524 B2 | * | 8/2002 | Kaneko et al. | 310/156.45 |
| 7,321,177 B2 | * | 1/2008 | Uchida et al. | 310/216.019 |
| 2007/0103024 A1 | | 5/2007 | Nakayama et al. | |
| 2008/0265706 A1 | * | 10/2008 | Nakayama et al. | 310/156.53 |
| 2009/0115280 A1 | * | 5/2009 | Nakayama et al. | 310/156.53 |
| 2009/0230803 A1 | * | 9/2009 | Nakayama et al. | 310/156.56 |

FOREIGN PATENT DOCUMENTS

| | | |
|---|---|---|
| JP | 58-136258 | 8/1983 |
| JP | 8-256441 | 10/1996 |
| JP | 2002-359941 | 12/2002 |
| JP | 2005-51982 | 2/2005 |

* cited by examiner

*Primary Examiner*—Tran N Nguyen
(74) *Attorney, Agent, or Firm*—Occhiuti Rohlicek & Tsao LLP

(57) ABSTRACT

An embedded magnet type motor is disclosed. The rotor core of the motor has radially extending first accommodation holes and V-shaped accommodation holes. Each V-shaped accommodation hole includes a second accommodation hole and a third accommodation hole. A first gap is formed in each first accommodation hole. The first gap is not occupied by the corresponding first magnet. A second gap is formed in each second accommodation hole. The second gap is not occupied by the corresponding second magnet. A third gap is formed in each third accommodation hole at a radially outer portion. The third gap is not occupied by the corresponding third magnet. Each second gap and the adjacent third gap form one V-shaped gap. The angular width θa of each first gap and the angular width θb of each V-shaped gap are determined to satisfy the expression: $0.60 < \theta a / \theta b < 1.60$.

8 Claims, 5 Drawing Sheets

EMBEDDED MAGNET TYPE MOTOR

BACKGROUND OF THE INVENTION

The present invention relates to an embedded magnet type motor.

Conventionally, a rotor core of an embedded magnet type motor has a plurality of accommodation holes aligned in the circumferential direction, and the accommodation holes perforate through the rotor core axially. In the accommodation holes, magnets are accommodated.

In the embedded magnet type motor disclosed in Japanese Laid-Open Patent Publication No. 2005-51982, each of a plurality of magnetic poles includes a pair of magnets arranged in a V shape to protrude radially inward. Specifically, when the number of magnetic poles of the embedded magnet type motor is P, the number of magnets is 2P. With this construction, a higher torque can be realized in comparison with a motor in which one magnet is provided per one magnetic pole.

However, when two magnets are provided per one magnetic pole, the number of parts increases and parts management cost and assembly cost also increase.

In the embedded magnet type motor of the publication described above, an outer bridge is formed between the radially outer end of each accommodation hole for accommodating a magnet and the outer peripheral surface of the rotor core. Two outer bridges are provided per one magnetic pole. Therefore, leakage fluxes passing through the outer bridges are excessive as a whole of the motor. This reduces the effective fluxes of the embedded magnet type motor and obstructs the torque increase.

SUMMARY OF THE INVENTION

An objective of the present invention is to provide an embedded magnet type motor which increases the torque while preventing an increase in the number of parts and reducing leakage fluxes.

To achieve the foregoing objective and in accordance with one aspect of the present invention, an embedded magnet type motor having a rotor is provided. The rotor includes a rotor core having an axial line and a plurality of magnets constituting magnetic poles, the number of which is represented by P. The rotor core has a plurality of accommodation holes arranged in a circumferential direction of the rotor core. The accommodation holes perforate the rotor core along the axial direction of the rotor core. The accommodation holes include first accommodation holes, the number of which is represented by P/2, and V-shaped accommodation holes, the number of which is represented by P/2. The first accommodation holes extend in radial directions of the rotor core. The V-shaped accommodation holes protrude radially outward. The first accommodation holes and the V-shaped accommodation holes are arranged alternately in the circumferential direction. Each V-shaped accommodation hole has a second accommodation hole and a third accommodation hole corresponding to two straight lines forming the V shape. Each first accommodation hole is adjacent to a second accommodation hole on one side in the circumferential direction and adjacent to a third accommodation hole on the other side. The magnets include first magnets disposed in the first accommodation holes, second magnets disposed in the second accommodation holes, and third magnets disposed in the third accommodation holes. Each first magnet and the second magnet adjacent to the same first magnet constitute one magnetic pole. Each first magnet and the third magnet adjacent to the same first magnet constitute another magnetic pole. A first gap is formed in each first accommodation hole at a radially outer portion. The corresponding first magnet does not occupy the first gap. A second gap is formed in each second accommodation hole at a radially outer portion. The corresponding second magnet does not occupy the second gap. A third gap is formed in each third accommodation hole at a radially outer portion. The corresponding third magnet does not occupy the third gap. Each second gap and the adjacent third gap form one V-shaped gap. An angular width θa of each first gap and an angular width θb of each V-shaped gap are determined to satisfy the expression: $0.60 < \theta a/\theta b < 1.60$.

Other aspects and advantages of the invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DESCRIPTION OF THE PREFERRED EMBODIMENTS

Figure 1:
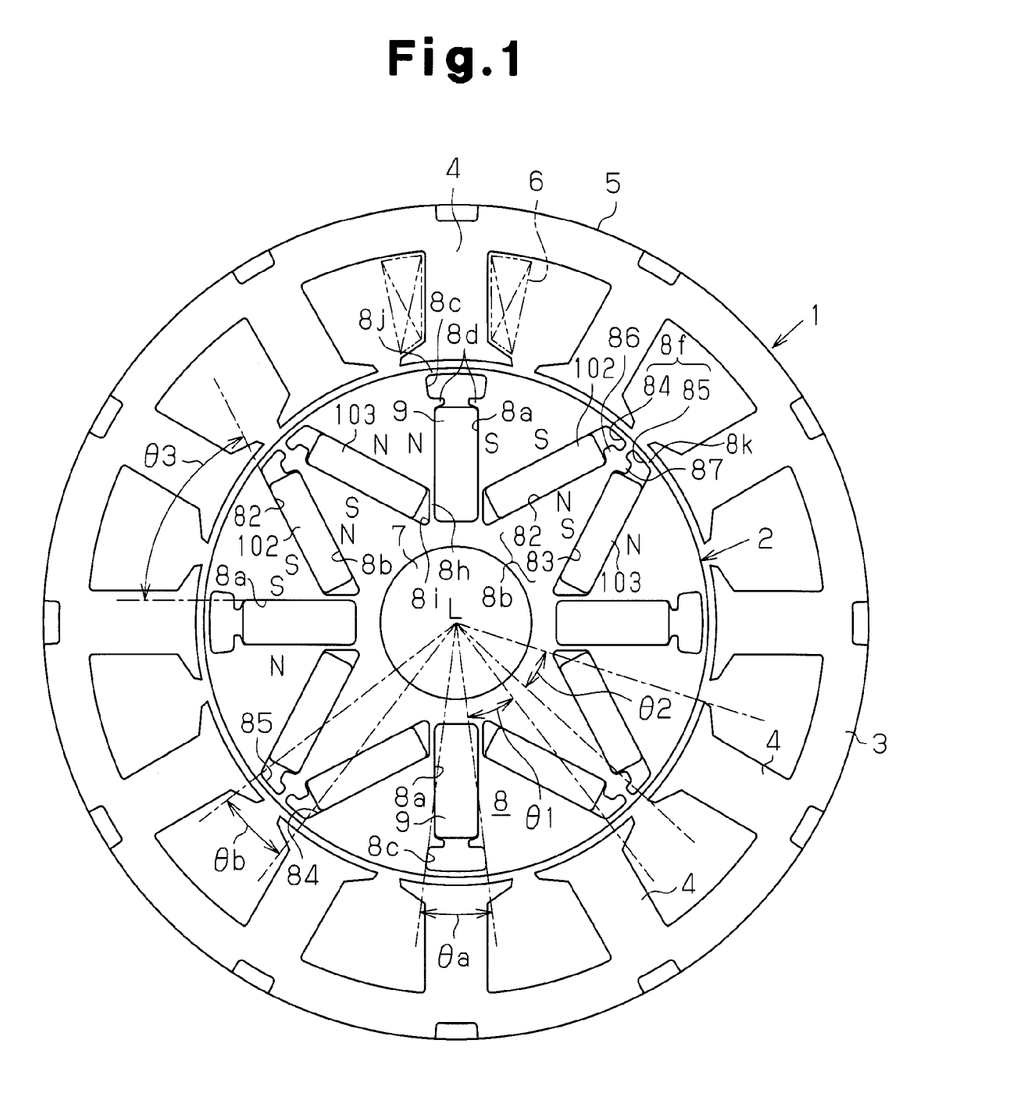
FIG. 1 is a plan view of an embedded magnet type motor according to one embodiment of the present invention.

Hereinafter, an embodiment of the present invention will be described with reference to FIG. 1 through FIG. 6. As shown in FIG. 1, an embedded magnet type motor includes a stator 1 and a rotor 2.

Figure 2:
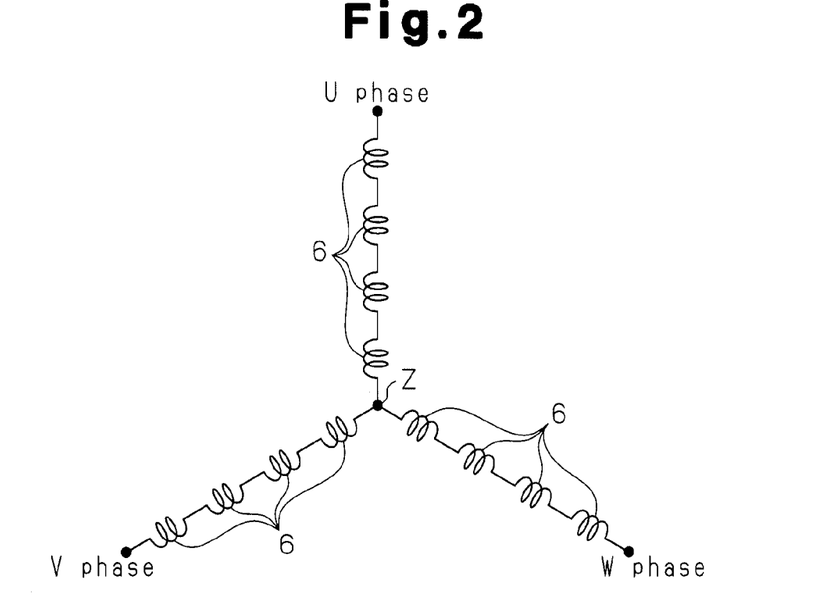
FIG. 2 is a connection diagram of coils in the motor shown in FIG. 1.

The stator 1 is cylindrical as a whole. The stator 1 includes a stator core 5 and a plurality of coils 6. The stator core 5 has a cylindrical portion 3 forming an outer shape and a plurality of teeth 4 arranged at equiangular intervals in the circumferential direction on the inner peripheral surface of the cylindrical portion 3. Each of these teeth extends toward the axial line L of the stator 1 from the inner peripheral surface of the cylindrical portion 3, that is, toward the radially inner side of the cylindrical portion 3. Each of the coils 6 is concentrically wound around a corresponding tooth 4 with an insulator (not shown). In FIG. 1, one coil 6 is shown by an alternate long and short double-dashed line. The stator core 5 of this embodiment includes twelve teeth 4. As shown in FIG. 2, the stator 1 has a total of three leads corresponding to a U phase, a V phase, and a W phase. Each lead forms four coils 6. Specifically, in each phase, four coils 6 are connected in series. The four coils 6 of each phase are wound around a total of four teeth 4, or every third one of the teeth 4. One end of each of the three leads is connected to a common neutral point Z. AC currents with a phase difference of 120 degrees are supplied to the other ends of the three leads.

The rotor 2 includes a rotary shaft 7, a rotor core 8 fixed to the rotary shaft 7, first magnets 9, the number of which is represented by P/2, second magnets 102, the number of which is represented by P/2, and third magnets 103, the number of which is represented by P/2. "P" indicates the number of magnetic poles of the rotor 2, and in this embodiment, "P" is eight. The second magnets 102 have the same shape as the third magnets 103.

The rotor core 8 is columnar. The rotor core 8 includes a plurality of core sheets laminated in the axial direction. The rotor core 8 has a central hole into which the rotary shaft 7 is fitted. The rotor core 8 is supported rotatably inside the stator 1. The rotor core 8 has a plurality of first accommodation holes 8a and a plurality of V-shaped accommodation holes 8b. Each first accommodation hole 8a accommodates one of the first magnets 9. Each V-shaped accommodation hole 8b accommodates one of the second magnets 102 and one of the third magnets 103. Each first accommodation hole 8a extends in the radial direction of the rotor 2. Each V-shaped accommodation hole 8b has a V shape protrusion toward the radially outer side. The number of first accommodation holes 8a is represented by P/2, that is, four in this embodiment. The number of V-shaped accommodation holes 8b is represented by P/2, that is, four in this embodiment. The first accommodation holes 8a and the V-shaped accommodation holes 8b perforate the rotor core 8 axially. The first accommodation holes 8a and the V-shaped accommodation holes 8b are arranged alternately at equiangular intervals in the circumferential direction of the rotor core 8.

A first gap 8c is formed in each first accommodation hole 8a at a radially outer portion. The corresponding first magnet 9 does not occupy the first gap 8c. The circumferential dimension of each first gap 8c is greater than that of the remainder of the first accommodation hole 8a. The first gap 8c substantially has a sectoral shape when viewed from the axial direction. The distance between the radially outer end of the first gap 8c and the outer peripheral surface of the rotor core 8 is constant along the circumferential direction. In other words, the radially outer end of the first gap 8c is arcuate with a center coinciding with the axial center of the rotor core 8. A pair of projections 8d, which face each other, are provided at a radially inner end of each first gap 8c. Each pair of the projections 8d extend in the circumferential direction of the rotor core 8, and reduces the width of the first accommodation hole 8a along the circumferential direction of the rotor core 8 compared to that of the remainder of the first accommodation hole 8a. Each pair of the projections 8d restricts radially outward movement of the first magnet 9 accommodated in the corresponding first accommodation hole 8a. The projections 8d in each pair have the same circumferential dimension (length).

Each V-shaped accommodation hole 8b includes a second accommodation hole 82 and a third accommodation hole 83. The second and third accommodation holes 82, 83 correspond to two straight lines that form the letter V of the V-shaped accommodation hole 8b. In the present embodiment, the circumferential distance between the second and third accommodation holes 82, 83 in each V-shaped accommodation hole 8b decreases toward the radially outer end. However, the second and third accommodation holes 82, 83 do not communicate with each other, but are separate from each other at the radially outer ends. A second gap 84 is formed in each second accommodation hole 82 at a radially outer portion. The corresponding second magnet 102 does not occupy the second gap 84. Likewise, a third gap 85 is formed in each third accommodation hole 83 at a radially outer portion. The corresponding third magnet 103 does not occupy the third gap 85. The circumferential dimension of the second gap 84 is substantially the same as the circumferential dimension of a part of the second accommodation hole 82 in which the second magnet 102 is accommodated. Likewise, the circumferential dimension of the third gap 85 is substantially the same as the circumferential dimension of a part of the third accommodation hole 83 in which the third magnet 103 is accommodated. Also, the distance between the radially outer end of the second accommodation hole 82 and the outer peripheral surface of the rotor core 8 is constant along the circumferential direction. In other words, the radially outer end of the second accommodation hole 82 is arcuate with a center coinciding with the axial center of the rotor core 8. A projection 86 is provided at a radially inner end of each second gap 84. The projection 86 extends in the circumferential direction of the rotor core 8, and reduces the width of the second accommodation hole 82 along the circumferential direction of the rotor core 8 compared to that of the remainder of the second accommodation hole 82. Each projection 86 restricts radially outward movement of the second magnet 102 accommodated in the corresponding second accommodation hole 82. Likewise, a projection 87 is provided at a radially inner end of each third gap 85. Each projection 87 is located at a position that corresponds to an adjacent one of the projections 86. The projection 87 extends in the circumferential direction of the rotor core 8, and reduces the width of the third accommodation hole 83 along the circumferential direction of the rotor core 8 compared to that of the remainder of the third accommodation hole 83. Each projection 87 restricts radially outward movement of the third magnet 103 accommodated in the corresponding third accommodation hole 83. The circumferential dimension (length) of the projection 87 is the same as the circumferential dimension (length) of the projection 86. The gaps 84, 85 of a pair of the accommodation holes 82, 83 forming each V-shaped accommodation hole 8b form a V-shaped gap 8f.

The angular width $\theta a$ of each first gap 8c and the angular width $\theta b$ of each V-shaped gap 8f are set in such manner that the ratio ($\theta a/\theta b$) satisfies $0.99 \leq \theta a/\theta b \leq 1.02$, and preferably that the ratio ($\theta a/\theta b$) is 1.00. That is, the angular width $\theta a$ of the first gap 8c and the angular width $\theta b$ of the V-shaped gap 8f are set such that the angular width $\theta a$ of the first gap 8c and the angular width $\theta b$ of the V-shaped gap 8f are equal to each other. The ration ($\theta a/\theta b$) is determined based on data obtained through experiments shown below (see FIGS. 3 to 5).

The angular width $\theta 1$ between the first gap 8c and the second gap 84 (the third gap 85) of adjacent pair of the first accommodation hole 8a and the V-shaped accommodation hole 8b is greater than the angular width $\theta 2$ of the radially inner end of each tooth 4. The angular width $\theta a$ of each first gap 8c and the angular width $\theta b$ of each V-shaped gap 8f are smaller than the angular width $\theta 2$ of the radially inner end of each tooth 4. In the present embodiment, the angular width $\theta 2$ is set to 27.4°. Also, in the present embodiment, the angular width $\theta 3$ between each first accommodation hole 8a and the circumferentially adjacent second accommodation hole 82 (the third accommodation hole 83) is set to 62.5°.

The radially inner end of each of the second and third accommodation holes 82, 83 is parallel to the inner wall face of the adjacent first accommodation hole 8a when viewed from the axial direction. An inner bridge 8h is provided between the radially inner end of each second accommodation hole 82 and the circumferentially adjacent first accommodation hole 8a, and between the radially inner end of each third accommodation hole 83 and the circumferentially adjacent first accommodation hole 8a. The width of each bridge 8h is constant when viewed from the axial direction of the rotor core 8. Therefore, a space 8i is formed in the radially inner end of each of the second and third accommodation holes 82, 83. The space 8i is substantially triangular when viewed from the axial direction. The rotor core 8 has an outer bridge 8j between the radially outer end of the first accommodation hole 8a and the outer peripheral surface of the rotor core 8. The rotor core 8 has an outer bridge 8k between the radially outer ends of the second and third accommodation holes 82, 83 and the outer peripheral surface of the rotor core 8. The radial dimension (thickness) of the outer bridge 8j and the radial dimension (thickness) of the outer bridge 8k are equal to each other. The thickness of the outer bridge 8j and the thickness of the outer bridge 8k are constant along the circumferential direction. In the case where the radial dimension (thickness) of the outer bridge 8j is constant along the circumferential direction, as in the present embodiment, the angular width θa of the first gap 8c is equivalent to the angular width between the circumferential ends of the outer bridge 8j. In the case where the first gap 8c substantially has a sectoral shape when viewed from the axial direction, as in the present embodiment, the angular width θa is constant at any given position in the radial direction of the first gap 8c. In the case where the radial dimension (thickness) of the outer bridge 8k is constant along the circumferential direction, as in the present embodiment, the angular width θb of the V-shaped gap 8f is equivalent to the angular width between the circumferential ends of the outer bridge 8k. In the case where the angular width of the V-shaped gap 8f increases toward the radial center, as in the present embodiment, the angular width at the radial end of the V-shaped gap 8f is set as the angular width θb of the V-shaped gap 8f. In the present embodiment, since the second accommodation hole 82 and the third accommodation hole 83 do not communicate each other and are formed as independent holes, a part of the outer bridge 8k that is radially outside of the second accommodation hole 82 and a part of the outer bridge 8k that is radially outside of the third accommodation hole 83 are separate from each other. The angular width b is determined such that these separate parts form a continuous outer bridge 8k. Each first accommodation hole 8a accommodates one of the first magnets 9, each second accommodation hole 82 accommodates one of the second magnets 102, and each third accommodation hole 83 accommodates one of the third magnets 103.

The first magnets 9 through third magnets 103 are rectangular parallelepipeds, and are magnetized in transverse directions when viewed from the axial direction of the rotor core 8. The first magnet 9 accommodated in each first accommodation hole 8a and the second magnet 102 accommodated in the adjacent second accommodation hole 82 form one magnetic pole, for example, a south pole. The first magnet 9 accommodated in each first accommodation hole 8a and the third magnet 103 accommodated in the adjacent third accommodation hole 83 form one magnetic pole, for example, a north pole. In the present embodiment, the remanent flux density of each of the first through third magnets 9 to 103 is 1.26 [T]. In the present embodiment, the longitudinal dimension of each first magnet 9 is 6.7 [mm], and the transverse dimension is 2.4 [mm] when viewed from the axial direction. Also, the longitudinal dimension of each second magnet 102 is 7.3 [mm], and the transverse dimension is 1.8 [mm] when viewed from the axial direction. The longitudinal dimension of each third magnet 103 is 7.3 [mm], and the transverse dimension is 1.8 [mm] when viewed from the axial direction. The longitudinal dimension (7.3 [mm]) of the second magnet 102 is 1.5 times the value obtained by subtracting, from the longitudinal dimension (6.7 [mm]) of the first magnet 9, the length of a portion of the second accommodation hole 82 that faces the space 8i. With respect to the axial direction of the rotor core 8, the dimensions of the first to third magnets 9 to 103 are the same as the dimension of the rotor core 8.

Figure 3:
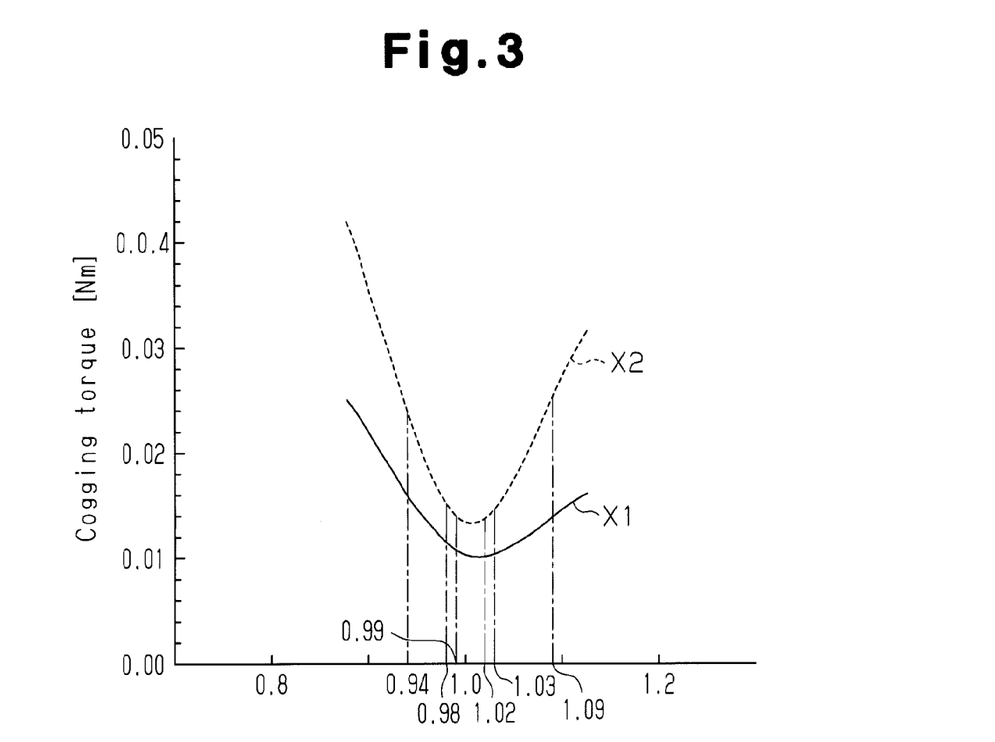
FIG. 3 is a graph showing the relationship between an angular ratio and cogging torque.
Figure 4:
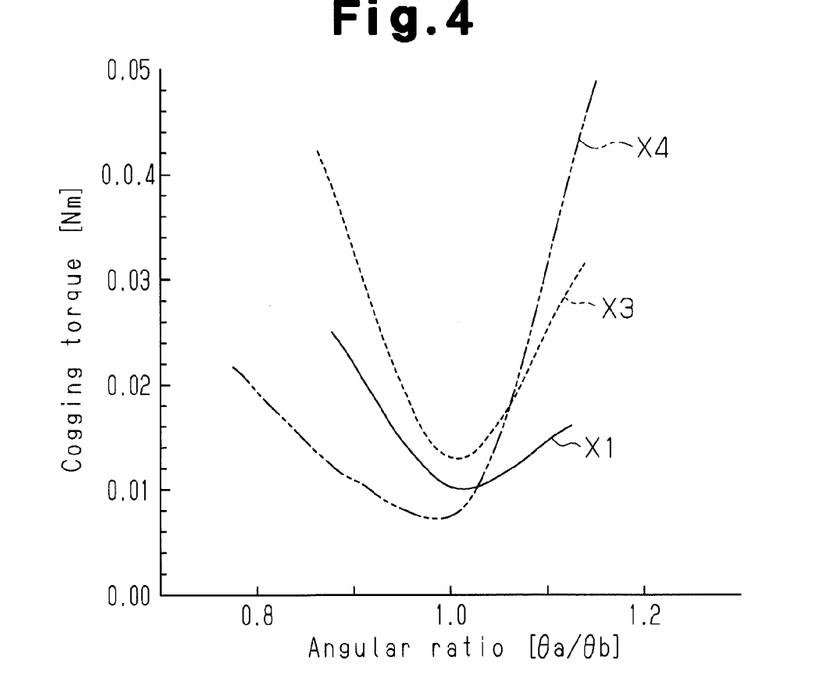
FIG. 4 is a graph showing the relationship between an angular ratio and cogging torque.
Figure 5:
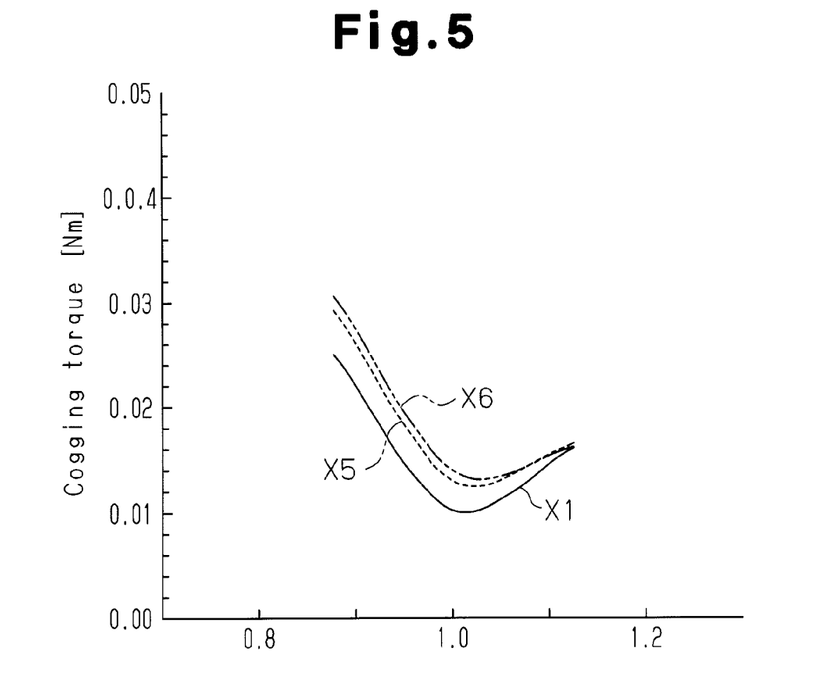
FIG. 5 is a graph showing the relationship between an angular ratio and cogging torque.

FIGS. 3 to 5 are graphs each showing the relationship between an angular ratio and cogging torque in the embedded magnet type motor obtained through experiments. Curve X1, which is shown by a solid line in FIGS. 3 to 5, represents the characteristics of an embedded magnet type motor in which, as the above embodiment, the angular width θ2 of the radially inner end of each tooth 4 is 27.4°, the number of poles (P) is eight, and the remanent flux density of each of the first, second, and third magnets 9, 102, and 103 is 1.26 [T]. Curve X2 shown by a broken line in FIG. 3 represents the characteristics of an embedded magnet type motor in which the angular width θ2 of the radially inner end of each tooth 4 is 26°. Also, curve X3 shown by a broken line in FIG. 4 represents the characteristics of an embedded magnet type motor the number of poles (P) of which is six. Also, curve X4 shown by an alternate long and two short dashes line in FIG. 4 represents the characteristics of an embedded magnet type motor the number of poles (P) of which is ten. Curve X5 shown by a broken line FIG. 5 represents the characteristics of an embedded magnet type motor in which the remanent flux density of each first magnet 9 is 1.42 [T], and the remanent flux density of each of the second and third magnets 102, 103 is 1.26 [T]. Curve X6 shown by an alternate long and two short dashes line FIG. 5 represents the characteristics of an embedded magnet type motor in which the remanent flux density of each first magnet 9 is 1.26 [T], and the remanent flux density of each of the second and third magnets 102, 103 is 1.42 [T].

From FIGS. 3 to 5, it was found out that when the ratio (θa/θb) between the angular width θa of the gap 8c and the angular width θb of the V-shaped gap 8f satisfies the expression $0.94 \leq \theta a/\theta b \leq 1.09$, the cogging torque remains in a range including the minimum value. In the ranges of the experiment, the cogging torque was more than or equal to 0.027 [Nm]. Also, it was found out that when the ratio (θa/θb) between the angular width θa of the gap 8c and the angular width θb of the V-shaped gap 8f satisfies the expression $0.98 \leq \theta a/\theta b \leq 1.03$, the cogging torque became smaller. In the ranges of the experiment, the cogging torque was more than or equal to 0.016 [Nm]. Further, it was found out that when the ratio (θa/θb) between the angular width θa of the gap 8c and the angular width θb of the V-shaped gap 8f satisfies the expression $0.99 \leq \theta a/\theta b \leq 1.02$, the cogging torque became smaller. In the ranges of the experiment, the cogging torque was less than or equal to 0.015 [Nm]. Based on these results, the ratio (θa/θb) is set to 1.00 in the present embodiment.

Figure 6:
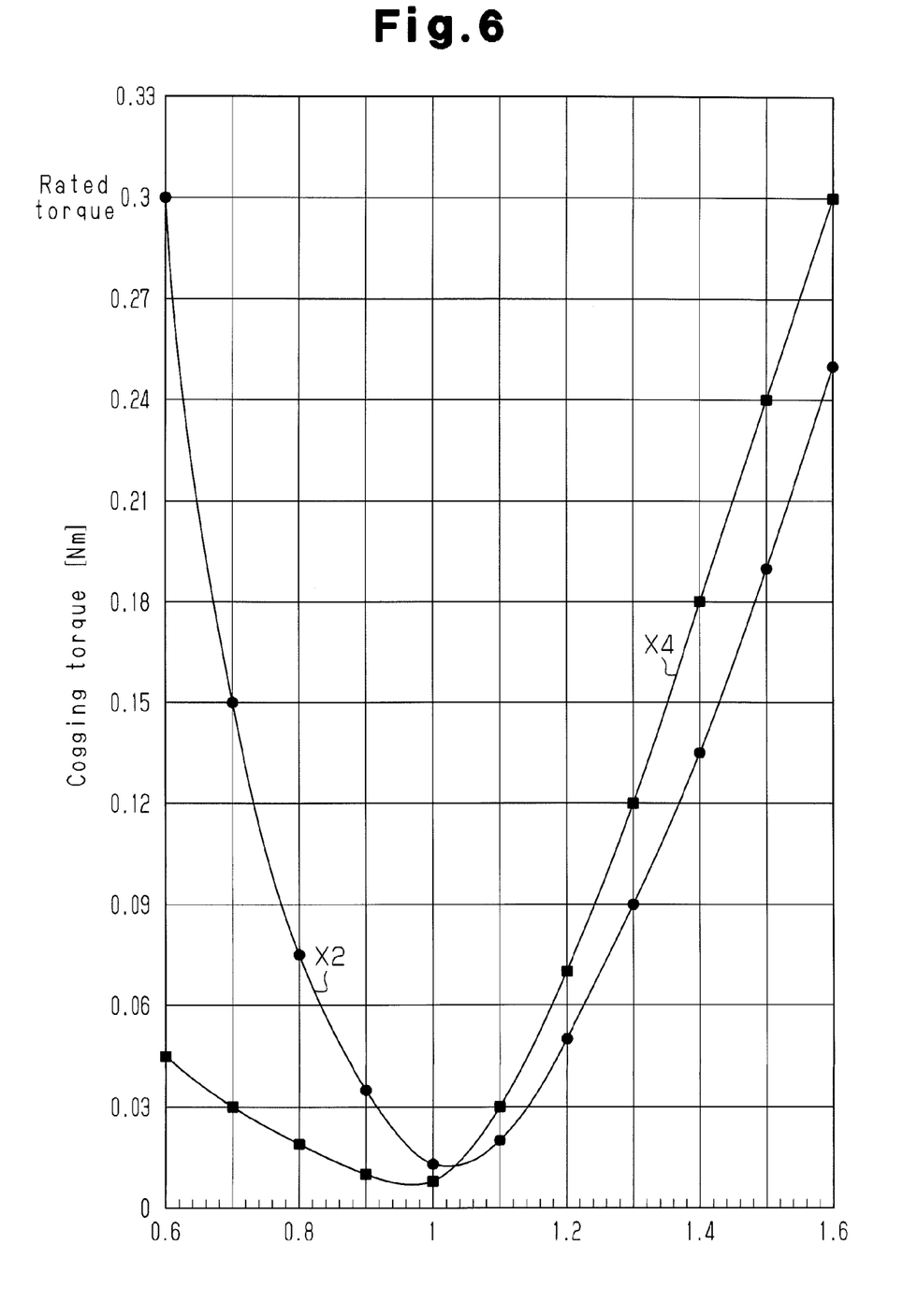
FIG. 6 is a graph showing the relationship between an angular ratio and cogging torque.

FIG. 6 shows data of the cogging torque on the curves X2 and X4 in the case where the ratio (θa/θb) was changed in a wide range of 0.60 to 1.60. The curve X2 shows the greatest rate of increase of the cogging torque when the ratio (θa/θb) was made less than 1.00. The curve X4 shows the greatest rate of increase of the cogging torque when the ratio (θa/θb) was made more than 1.00.

According to the curves X2 and X4, when the ratio (θa/θb) between the angular width θa of the gap 8c and the angular width θb of the V-shaped gap 8f satisfies the expression $0.60 < \theta a/\theta b < 1.60$, the cogging torque does not reach the rated torque, and the startability of the motor is ensured. In the present embodiment, the rated torque is 0.3 [Nm]. When the ratio (θa/θb) between the angular width θa of the gap 8c and the angular width θb of the V-shaped gap 8f satisfies the expression 0.70≦θa/θb≦1.35, the cogging torque is more than or equal to the half the rated torque, or 0.15 [Nm]. Accordingly, the motor has high startability and responsiveness. Further, when the ratio (θa/θb) between the angular width θa of the gap 8c and the angular width θb of the V-shaped gap 8f satisfies the expression 0.92≦θa/θb≦1.10, the cogging torque is more than or equal to 10% of the rated torque, or 0.03 [Nm]. Accordingly, the motor has significantly high startability and responsiveness.

The present embodiment has the following advantages.

(1) One first magnet 9 accommodated in each first accommodation hole 8a constitutes a part of the north pole and a part of the south pole of the rotor 2. Specifically, one first magnet 9 accommodated in each first accommodation hole 8a is shared by two magnetic poles. Therefore, when the number of magnetic poles of the rotor core 8 is represented by P, the rotor core 8 has first magnets 9, the number of which is represented by P/s, second magnets 102, the number of which is represented by P/s, and third magnets 103, the number of which is represented by P/s. That is, the rotor core 8 has magnets, the number of which is represented by (3/2)/P. In the present embodiment, twelve magnets are used and the number of magnetic poles is 8. On the other hand, a rotor core of a conventional embedded magnet type motor requires magnets, the number of which is represented by 2P. Therefore, in the present embodiment, the number of magnets is reduced. As a result, the number of parts is reduced, and moreover, parts management cost and assembly cost are reduced.

One first accommodation hole 8a is shared by two magnetic poles. Thus, each outer bridge 8j formed between the first gap 8c, which is formed in each first accommodation hole 8a at a radially outer portion, and the outer peripheral surface of the rotor core 8 is shared by two magnetic poles. Therefore, the number of the outer bridges 8j in the rotor core 8 is reduced, and leakage fluxes that pass through the outer bridges 8j is reduced.

Further, when the ratio (θa/θb) between the angular width θa of the gap 8c of each first accommodation hole 8a and the angular width θb of the V-shaped gap 8f of each V-shaped accommodation hole 8b satisfies the expression 0.99≦θa/θb≦1.02, the cogging torque is substantially the minimum value. As indicated by solid lines in FIGS. 3 to 5, the value of the cogging torque in the present embodiment is approximately 0.010 [Nm] when the ratio (θa/θb) is 1.0 on the curve X1.

Since ratio (θa/θb) satisfies the expression 0.92≦θa/θb≦1.10, the cogging toque is more than or equal to 10% of the rated torque. As a result, a motor having significantly high startability and responsiveness is provided.

(2) The angular width θ1 is defined between each first gap 8c and the circumferentially adjacent second gap 84 (the third gap 85) and substantially serves as a magnetic pole of the rotor 2 that faces the stator 1. The angular width θ1 is greater than the angular width θ2 of the radially inner end of each tooth 4. Therefore, in comparison with a motor in which the angular width θ1 is smaller than the angular width θ2, the angular width of fluxes that each tooth 4 receives from the rotor 2 is wider, so that higher efficiency is realized.

(3) The angular width θa of the first gap 8c and the angular width θb of the V-shaped gap 8f are smaller than the angular width θ2 of the radially inner end of each tooth 4, so that the radially inner end of the tooth 4 can always be made to face the substantial magnetic pole (between the first gap 8c and the V-shaped gap 8f) of the rotor 2, whereby the efficiency of the motor is improved.

The above-described embodiment may be modified as follows.

The shapes of the first gap 8c and the V-shaped gap 8f may be changed as long as the ratio (θa/θb) between the angular width θa of the gap 8c of each first accommodation hole 8a and the angular width θb of the V-shaped gap 8f of each V-shaped accommodation hole 8b satisfies the expression 0.94≦θa/θb≦1.09. If the ratio θa/θb satisfies the expression 0.94≦θa/θb≦1.09, the cogging torque has a small value in a range including the minimum value, that is, 0.027 [Nm] in the range of the conducted experiments. The ratio θa/θb may be changed within the range in which the expression 0.98≦θa/θb≦1.03 is satisfied. If the ratio θa/θb satisfies the expression 0.98≦θa/θb≦1.03, the cogging torque has a small value in a range including the minimum value, that is, 0.016 [Nm] in the range of the conducted experiments.

Further, even if the ratio (θa/θb) between the angular width θa of the first gap 8c and the angular width θb of the V-shaped gap 8f does not satisfy the expression 0.94≦θa/θb≦1.09, the shapes of the first gap 8c and the V-shaped gap 8f may be changed as long as the ratio (θa/θb) satisfies the expression 0.60<θa/θb<1.60. As shown in FIG. 6, if the expression 0.6<θa/θb<1.60 is satisfied, the cogging torque does not reach the rated torque, and the startability of the motor is ensured. In other words, when the expression 0.60<θa/θb<1.60 is not satisfied, the motor is not hindered from being started due to the cogging torque reaching the rated torque. That is, the rotor 2 is not hindered from being rotated. The shapes of the first gap 8c and the V-shaped gap 8f may be changed within the range in which the expression 0.70≦θa/θb≦1.35 is satisfied. As shown in FIG. 6, if the expression 0.70≦θa/θb≦1.35 is satisfied, the cogging torque is equal to or less than half the rated torque, and the motor has high startability and responsiveness.

The radial thickness of each outer bridge 8j is not limited to be constant along the circumferential direction.

Figure 7A:
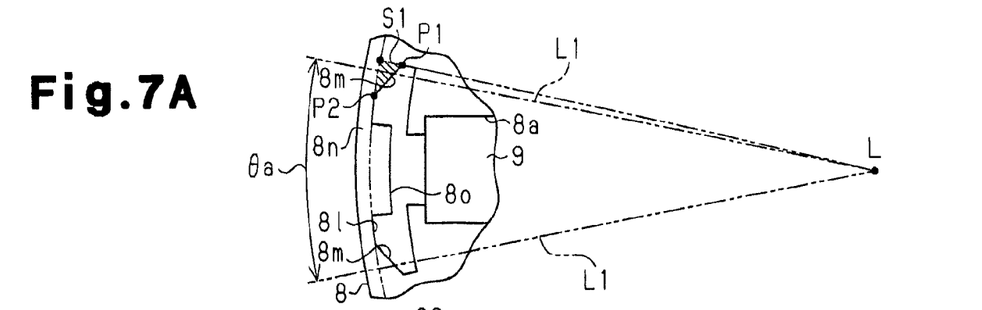
FIG. 7A is an enlarged plan view illustrating a rotor according to a modified embodiment.

For example, the shape of the outer bridge 8j may be changed as shown in FIG. 7A. In a first gap 8l shown in FIG. 7A, linear inclined portions 8m are formed at circumferential ends at the radially outward end. Each inclined portion 8m is inclined so as to approach the radially inner end toward the circumferential end of the first gap 8l. Accordingly, the radial thickness of the outer bridge 8n is gradually increased toward the circumferential ends. On the radially end face that defines the first gap 8l, a small diameter portion 8o projecting radially inward is formed between the pair of the inclined portions 8m. The angular width θa of each first gap 8l is defined as shown below according to experiment results, such that the characteristics of the motor are substantially the same as those of the shape according to the above described embodiment. The radially outer end of the circumferentially outermost side of each first gap 8l is defined as a point P1. The circumferentially outer end of the radially outermost side of the first gap 8l is defined as a point P2. The straight line connecting the point P1 and the point P2 (that is, the inclined portion 8m), an imaginary arc that includes the point P2 and is at a constant distance from the outer peripheral surface of the rotor core 8, and an imaginary radial straight line extending radially outward from the point P1 is defined as S1, which is a cross hatched section shown in FIG. 7A. A line that equally divides the area S1 into two in the circumferential direction is defined as L1. The angular width defined by the lines L1 is the angular width θa of the first gap 8l. The motor having the thus defined angular width θa has the same characteristics as the results (see FIGS. 3 to 6) of the above described experiments, and therefore has the same advantages as the above described embodiment.

Figure 7B:
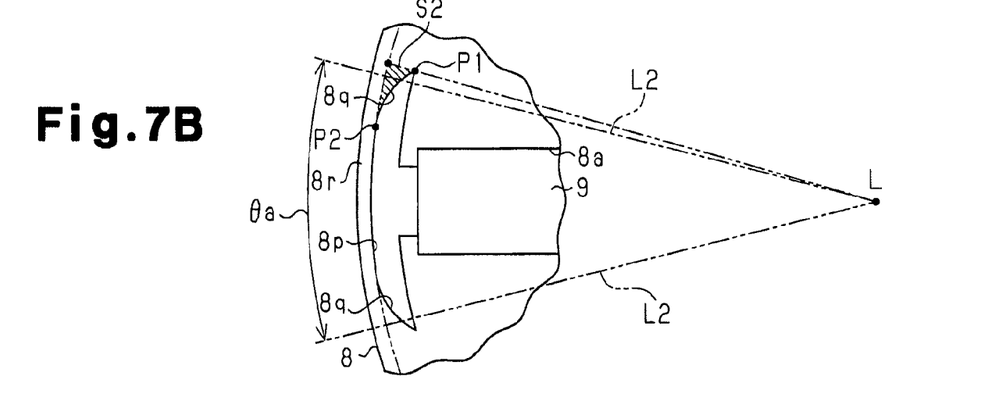
FIG. 7B is an enlarged plan view illustrating a rotor according to a modified embodiment.

Alternatively, the shape of the outer bridge 8j may be changed as shown in FIG. 7B. In a first gap 8p shown in FIG. 7B, curved portions 8q curved radially inward are formed at circumferential ends at the radially outward end. Toward the corresponding circumferential end, each curved portion 8q is curved further radially inward. Accordingly, the radial thickness of the outer bridge 8r is gradually increased toward the circumferential ends. The angular width θa of each first gap 8p is defined as shown below according to experiment results, such that the characteristics of the motor are substantially the same as those of the shape according to the above described embodiment. The radially outer end of the circumferentially outermost side of each first gap 8p is defined as a point P1. The circumferentially outer end of the radially outermost side of the first gap 8p is defined as a point P2. The curve connecting the point P1 and the point P2 (that is, the curved portion 8q), an imaginary arc that includes the point P2 and is at a constant distance from the outer peripheral surface of the rotor core 8, and an imaginary radial straight line extending radially outward from the point P1 is defined as S2, which is a cross hatched section shown in FIG. 7B. A line that equally divides the area S2 into two in the circumferential direction is defined as L2. The angular width defined by the lines L2 is the angular width θa of the first gap 8p. The motor having the thus defined angular width θa has the same characteristics as the results (see FIGS. 3 to 6) of the above described experiments, and therefore has the same advantages as the above described embodiment.

The radial thickness of each outer bridge 8k is not limited to be constant along the circumferential direction.

Figure 7C:
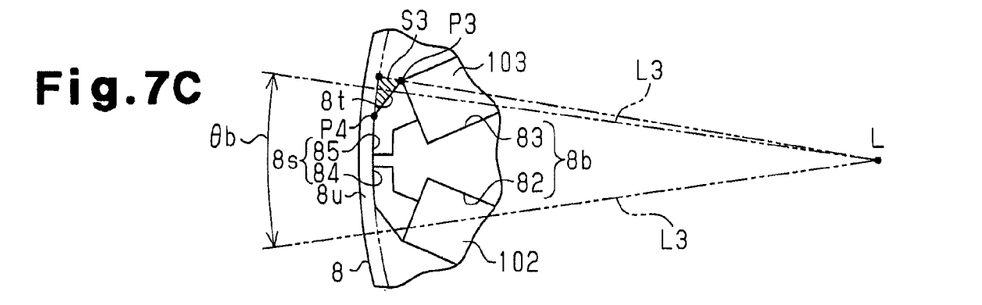
FIG. 7C is an enlarged plan view illustrating a rotor according to a modified embodiment.

For example, the shape of the outer bridge 8k may be changed as shown in FIG. 7C. A second gap 84 and a third gap 85 form a V-shaped gap 8s shown in FIG. 7C. Each of the second and third gaps 84, 85 has a linear inclined portion 8t that is inclined radially inward at the radially outer end. Each inclined portion 8t is inclined further radially inward toward the circumferential end. Accordingly, the radial thickness of the outer bridge 8u is gradually increased toward the circumferential ends. The angular width θb of each V-shaped gap 8s is defined as shown below according to experiment results, such that the characteristics of the motor are substantially the same as those of the shape according to the above described embodiment. The radially outer end of the circumferentially outermost side of each V-shaped gap 8s is defined as a point P3. The circumferentially outer end of the radially outermost side of the V-shaped gap 8s is defined as a point P4. The straight line connecting the point P3 and the point P4 (that is, the inclined portion 8t), an imaginary arc that includes the point P4 and is at a constant distance from the outer peripheral surface of the rotor core 8, and an imaginary radial straight line extending radially outward from the point P3 is defined as S3, which is a cross hatched section shown in FIG. 7C. A line that equally divides the area S3 into two in the circumferential direction is defined as L3. The angular width defined by the lines L3 is the angular width θb of the V-shaped gap 8s. The motor having the thus defined angular width θb has the same characteristics as the results (see FIGS. 3 to 6) of the above described experiments, and therefore has the same advantages as the above described embodiment.

Figure 7D:
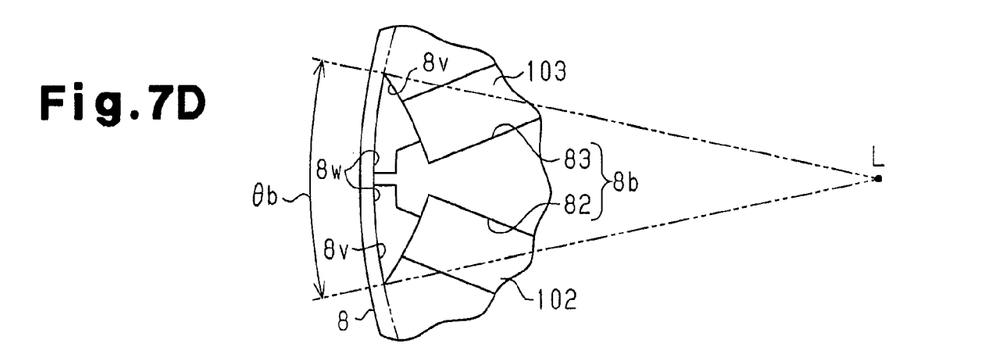
FIG. 7D is an enlarged plan view illustrating a rotor according to a modified embodiment.

As shown in FIG. 7D, a pair of V-shaped gaps 8w may be provided that maintains a constant distance between the radially outer face and the outer peripheral face of the rotor core 8 along the circumferential direction. Each V-shaped gap 8w has an extended portion 8v that extends circumferentially outward further than the corresponding second accommodation hole 82 (the third accommodation hole 83). In this case, the angular width θb of the V-shaped gap 8f is defined based on the ends at the circumferentially outermost ends of the V-shaped gaps 8w.

The angular width θ2 of the radially inner end of each tooth 4 does not need to be 27.4°. The angular width θ2 may be, for example, 26°.

The number of magnetic poles (P) may be a number other than eight. The number of magnetic poles (P) may be six or ten. In these cases, the number of the teeth 4 may be changed.

The remanent flux density of each of the first, second, and third magnets 9, 102, and 103 is not particularly limited. For example, either the remanent flux density of each of the first magnet 9 or the remanent flux density of the second, and third magnets 102 and 103 may be changed to 1.42 [T].

In the illustrated embodiments, the width of each first gap 8c when viewed from the axial direction, that is, the circumferential dimension, is larger than that of the remaining portion (portion in which the magnet 9 is arranged. However, the width of the first gap 8c, that is, the circumferential dimension, may be changed as long as the ratio (θa/θb) between the angular width θa of the first gap 8c and the angular width θb of the V-shaped gap 8f satisfies the expression 0.60≦θa/θb≦1.60. For example, the width of the first gap 8c when viewed from the axial direction and its transverse dimension when viewed from the axial direction of the first magnet 9 may be equal to each other.

In the illustrated embodiments, the second accommodation hole 82 and the third accommodation hole 83, which form the V-shaped accommodation hole 8b, are independent from each other and do not communicate with each other. However, the configuration is not limited to this. The second accommodation hole 82 and the third accommodation hole 83 may be connected to each other at radially outer ends, or at a pair of V-shaped gaps 8f in the V-shaped accommodation hole 8b.

The width of each inner bridge 8h when viewed from the axial direction does not need to be constant along the radial direction. The width of each inner bridge 8h when viewed from the axial direction may be changed along the radial direction. For example, the extended portions 8i of the above described embodiment may be omitted.

The rotor core 8 is not limited to an axial lamination structure of core sheets 11, and may be a sintered core obtained by sintering, for example, magnetic powder.

What is claimed is:

1. An embedded magnet type motor, comprising a rotor, wherein the rotor includes a rotor core having an axial line and a plurality of magnets constituting magnetic poles, the number of which is represented by P, wherein the rotor core has a plurality of accommodation holes arranged in a circumferential direction of the rotor core, wherein the accommodation holes perforate the rotor core along the axial direction of the rotor core, wherein the accommodation holes include first accommodation holes, the number of which is represented by P/2, and V-shaped accommodation holes, the number of which is represented by P/2, the first accommodation holes extending in radial directions of the rotor core, the V-shaped accommodation holes protruding radially outward, wherein the first accommodation holes and the V-shaped accommodation holes are arranged alternately in the circumferential direction, each V-shaped accommodation hole has a second accommodation hole and a third accommodation hole corresponding to two straight lines forming the V shape, and each first accommodation hole is adjacent to a second accommodation hole on one side in the circumferential direction and adjacent to a third accommodation hole on the other side, wherein the magnets include first magnets disposed in the first accommodation holes, second magnets disposed in the second accommodation holes, and third magnets disposed in the third accommodation holes, and each first magnet and the second magnet adjacent to the same first magnet constitute one magnetic pole, and each first magnet and the third magnet adjacent to the same first magnet constitute another magnetic pole, wherein a first gap is formed in each first accommodation hole at a radially outer portion, the corresponding first magnet not occupying the first gap, wherein a second gap is formed in each second accommodation hole at a radially outer portion, the corresponding second magnet not occupying the second gap, and wherein a third gap is formed in each third accommodation hole at a radially outer portion, the corresponding third magnet not occupying the third gap, each second gap and the adjacent third gap forming one V-shaped gap, and wherein an angular width $\theta a$ of each first gap and an angular width $\theta b$ of each V-shaped gap are determined to satisfy the expression: $0.60 < \theta a/\theta b < 1.60$.

2. The motor according to claim 1, wherein the angular widths $\theta a$ and $\theta b$ are determined to satisfy the expression: $0.70 \leq \theta a/\theta b \leq 1.35$.

3. The motor according to claim 1, wherein the angular widths $\theta a$ and $\theta b$ are determined to satisfy the expression: $0.92 \leq \theta a/\theta b \leq 1.10$.

4. The motor according to claim 1, wherein the angular widths $\theta a$ and $\theta b$ are determined to satisfy the expression: $0.94 \leq \theta a/\theta b \leq 1.09$.

5. The motor according to claim 1, wherein the angular widths $\theta a$ and $\theta b$ are determined to satisfy the expression: $0.98 \leq \theta a/\theta b \leq 1.03$.

6. The motor according to claim 1, wherein the angular widths $\theta a$ and $\theta b$ are determined to satisfy the expression: $0.99 \leq \theta a/\theta b \leq 1.02$.

7. The motor according to claim 1, wherein the rotor includes a stator at a radially outer portion, the stator having a plurality of teeth that extend radially inward, wherein a coil is wound about each of the teeth, and wherein the angular width between each first gap and the circumferentially adjacent V-shaped gap is greater than an angular width of the radially inner end of each tooth.

8. The motor according to claim 1, wherein the rotor includes a stator at a radially outer portion, the stator having a plurality of teeth that extend radially inward, wherein a coil is wound about each of the teeth, and wherein the angular width of each first gap and the angular width of each V-shaped gap are smaller than an angular width of the radially inner end of each tooth.

* * * * *